United States Patent
Hoffmann et al.

(10) Patent No.: US 7,017,387 B2
(45) Date of Patent: Mar. 28, 2006

(54) CALIBRATION AND VALIDATION FOR LEAK DETECTOR

(75) Inventors: Jacques Hoffmann, Lincolnwood, IL (US); David J. Balke, Morton Grove, IL (US); Peter Davey, Oxford (GB)

(73) Assignee: Intertech Development Company, Skokie, IL (US)

( * ) Notice: Subject to any disclaimer, the term of this patent is extended or adjusted under 35 U.S.C. 154(b) by 0 days.

(21) Appl. No.: 10/689,162

(22) Filed: Oct. 20, 2003

(65) Prior Publication Data

US 2005/0081597 A1    Apr. 21, 2005

(51) Int. Cl.
*G01L 27/00* (2006.01)
(52) U.S. Cl. ........................................... 73/1.63
(58) Field of Classification Search ............... 73/1.02, 73/1.03, 1.57, 1.58, 1.59, 1.63, 40, 49.2, 73/49.3
See application file for complete search history.

(56) References Cited

U.S. PATENT DOCUMENTS

| | | | | |
|---|---|---|---|---|
| 3,504,528 | A | * | 4/1970 | Trier et al. ..................... 73/49.3 |
| 3,584,500 | A | * | 6/1971 | Diehl et al. ..................... 73/39 |
| 3,921,436 | A | * | 11/1975 | Plegat ............................ 73/40 |
| 4,686,851 | A | * | 8/1987 | Holm et al. .................. 73/49.2 |
| 4,899,573 | A | * | 2/1990 | Dimmick et al. ............. 73/49.2 |
| 6,279,383 | B1 | * | 8/2001 | Balke et al. .................... 73/40 |
| 6,848,292 | B1 | * | 2/2005 | Joseph et al. ................. 73/1.57 |

* cited by examiner

*Primary Examiner*—Charles Garber
(74) *Attorney, Agent, or Firm*—Fitch, Even, Tabin & Flannery

(57) ABSTRACT

A leak test arrangement having a leak calibration device is disclosed. The calibration device is connected into communication with the leak test arrangement and provides a controlled source (sink) of fluid at a predetermined amount. The calibration includes a substantially sealed volume of fluid in fluid communication with the test arrangement and a control arrangement for heating and/or cooling the volume to produce the source (sink) of the calibrator.

25 Claims, 3 Drawing Sheets

CALIBRATION AND VALIDATION FOR LEAK DETECTOR

BACKGROUND

The present invention relates to leak detection systems and particularly to methods and apparatus for calibrating and validating such systems.

Leak detecting instruments are used in a variety of industries to determine whether products are properly manufactured and assembled. Leak detecting instruments are used to test products for the presence of leaks which may degrade the performance of the product during the product's useful life. Not all leaks are fatal to the performance of a product and a maximum acceptable leak is often established for a product. Consequently, leak detecting instruments must be able to distinguish between leaks which fall above or below the maximum acceptable leak.

Because leak detecting instruments not only detect leaks, but measure the amount of leakage as well, leak detecting instruments are calibrated to accurately measure the amount of leak into or from a part being tested. Leak detecting instruments are therefore calibrated to a leak standard. The leak standard establishes a known flow rate or pressure change which is used to calibrate the sensing apparatus of the leak detection equipment measuring leakage, thereby ensuring that the leak detection equipment accurately measures the amount of leak present in the parts being tested.

The basis of known dry-air leak detection instruments is either a pressure-difference sensor or a mass-flow sensor. Examples of such systems are shown U.S. Pat. No. 5,546, 789 and U.S. Pat. No. 6,279,383 which are assigned to the assignee of the present invention. For quality assurance purposes, the correct performance of the instrument (not simply of the pressure or flow transducer) is validated periodically against some external standard. The most common method of accomplishing this is to connect a "calibrated leak", i.e., a small constriction or orifice passing a fixed leak flow at the required test pressure, in parallel across a known-good test part. Leakage through the test part, if any, is identified as "zero" leak and is off set during the leak detector calibration process. A leak detection instrument which shows a leak rate corresponding to the calibrated leak is then considered validated. Another method, applicable to pressure-difference systems, is to arrange for a small piston to be moved in a sealed cylinder through a known stroke volume as shown in U.S. Pat. No. 4,811,252. An improved method is to use a calibrated precision flow sensor in series with an adjustable needle-valve in place of the constriction, the valve being adjusted by hand until the desired leak flow appears as shown in U.S. Pat. No. 5,363,689.

Although each of the above systems has proven to be valuable they exhibit drawbacks in production use. For example, the pneumatic resistance of a small constriction or orifice varies with air temperature and density, and is liable to change over time as it becomes partially blocked by contamination or moisture. Also, the piston of a pressure type detector moving through a stroke volume may suffer from sticking problems as well as wear due to motion of the seals.

Further, a production supervisor may wish to set-up automatic validation of the leak detection instrument, perhaps once per part tested for safety-critical units, or at lesser intervals of once per shift or once per week for less demanding applications. Up to now, this required a solenoid valve to be opened by the automatic control at the correct time, to connect a standard leak into the leak-test system. Actuating the valve inevitably involves a change in the volume of the system, which in itself can disturb the leak measurement and introduce error in the validation, particularly in the testing of smaller parts.

A need exists for an improved reference source cell leak flow calibration source as well as an improved arrangement for fitting such a source into production testing equipment.

DESCRIPTION

Figure 1:
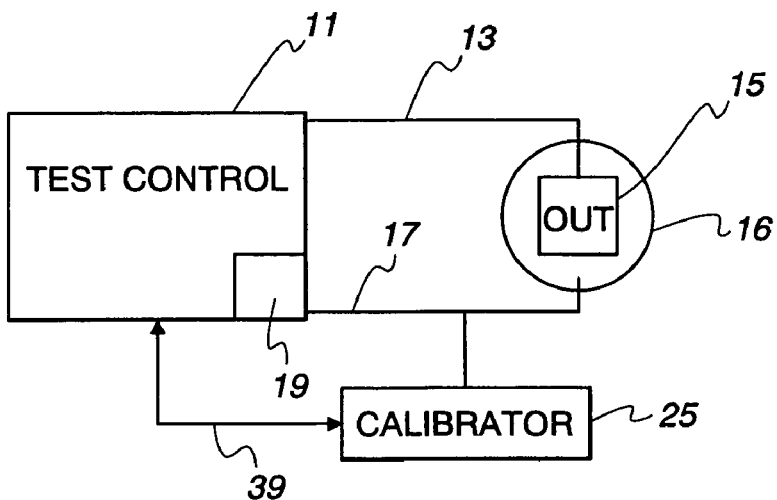
FIG. 1 is a block diagram of a down side test system including calibration.
Figure 2:
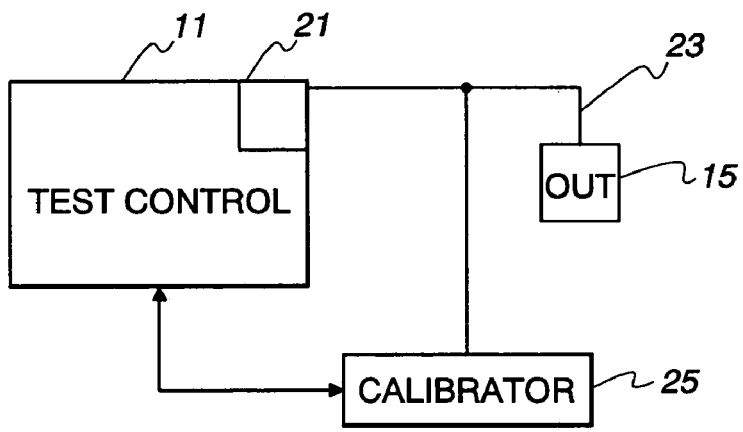
FIG. 2 is a block diagram of an upside test system including calibration.

Leak detection systems generally comprise a controller which sequences the functions of a leak test and which includes apparatus for providing a leak test flow or a leak test pressure, (which may be greater than or less than ambient pressure), to a device being tested. The leak test control also includes apparatus for measuring any leak resulting from the applied test flow or test pressure. FIG. 1 represents a down side leak testing system which includes a control 11 having a conduit 13 in fluid communication with a device under test, shown at 15. In FIG. 1 the device under test is in a sealed container 16 such as a bell jar. A conduit 17 connects the inside of the sealed container 16 back to a testing apparatus 19 which is a part of control 11. A test of device under test 15 is performed by applying a pressure to the device under test via conduit 13 and sensing a change within sealed container 16 via conduit 17. The general configuration of FIG. 1 is referred to as down side testing in which a separate conduit 17 is used to test for leaks occasioned by changes in flow or pressure communicated via conduit 13. FIG. 2 represents what is referred to as up side testing. In FIG. 2 the controller 11 is connected to the device under test via a single conduit 23 which is used to supply a pressure and which also serves to be the testing conduit connecting to a testing apparatus 21. The arrangement of FIGS. 1 and 2 both include a testing conduit (13 or 23) and a testing apparatus (19 or 21) connected to the testing conduit which may measure changes in mass flow or in pressure, occasioned by leaks in the device under test.

Each of FIGS. 1 and 2 include a calibrator 25 which is connected to and in fluid communication with a respective testing conduit (17 or 23). In both situations the calibrator 25 can remain permanently connected to its test conduit and be used for calibrating control 11 as desired by an operator or the testing routine.

Figure 3:
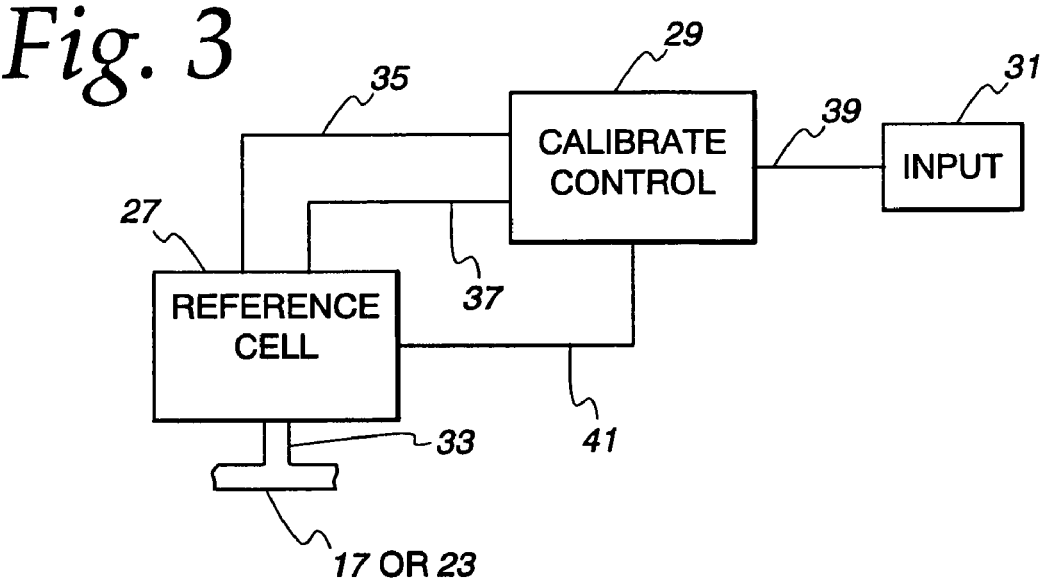
FIG. 3 is a block diagram of a calibration reference cell and control therefor.

FIG. 3 is a block diagram representing a calibrator 25 in greater detail. Included is a reference cell 27 which is connected in fluid communication with a testing conduit numbered 17 or 23. The reference cell comprises a substantially sealed volume, the fluid property environment of which is controlled by a calibrate control 29. Reference cell 27 is referred to as substantially sealed because its only intended fluid inlet/outlet is a conduit 33 connected to testing conduit 17 or 23. Calibrate control 29 may receive electrical signals representing the pressure in the volume of reference cell 27 via a conductor 35. The inverse of the pressure signal may advantageously be used in calibrate control 29 to produce a true mass flow in conduit 33. Similarly, calibrate control 29 may receive electrical signals representing the temperature in the volume of reference cell 27 via a conductor 37. Input signals are received by calibrate control 29 via a conductor 39 from an input device 31. A primary function of calibrate control 29 is to establish a feed back loop for the reference cell 27 by responding in a pre-established manner to send control signals to the reference cell 27 via a conductor 41. Thus, in response to signals from input 31, calibrate control 29 sends electrical signals on conductor 41 to reference cell 27 to control the temperature of its volume. The amount of control on conductor 41 from calibrate control is adjusted responsive to feed back signals on conductors 35 and 37.

Calibrate control 29 may be a digital or analog device which is pre-set to perform the control loop function. A digital control may include, for example, a programmed micro-processor (not shown) having comparator inputs at which an incoming signal e.g., temperature on conductor 37, is compared with a predetermined value and, based on that digital comparison, the signal on control conductor 41 is varied. Such control signal variation may be produced by a digital to analog signal convertor receiving digital signals from the micro-processor and converting the digital to analog which is applied to reference cell 27. Input 31 is shown as a separate device such as a user operated keyboard however, input signals on conductor 39 may be provided by a system controller, such as test control 11 (FIG. 1).

Figure 5:
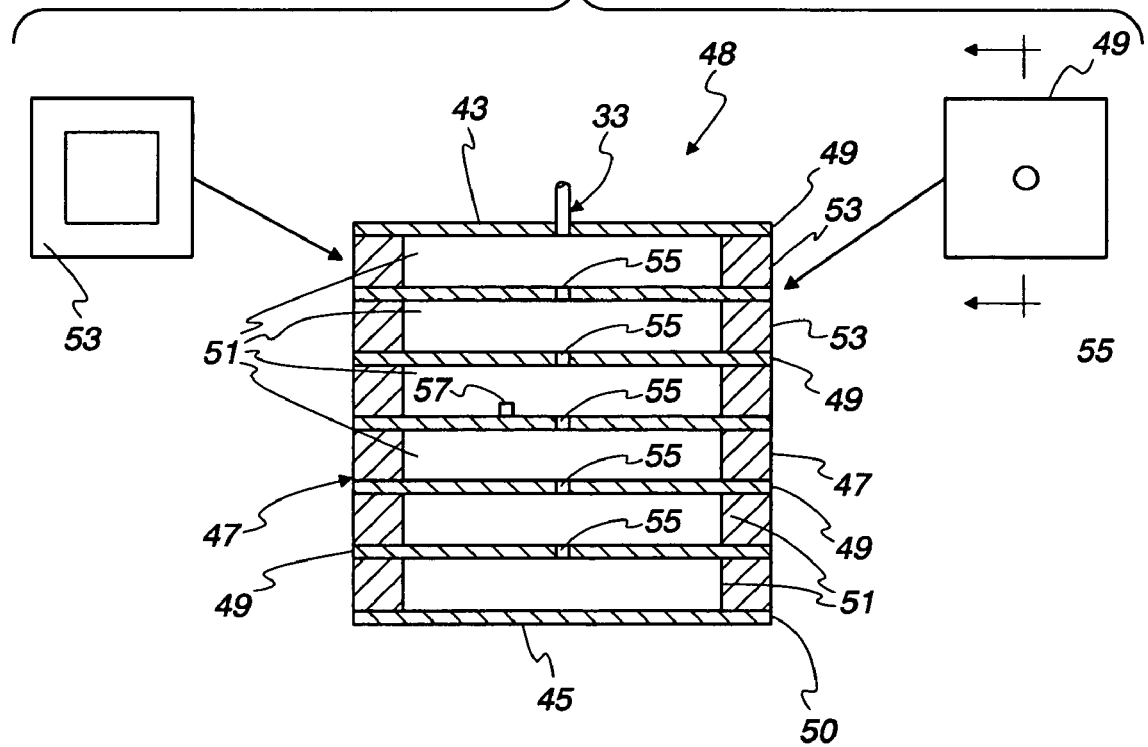
FIG. 5 is a sectional view of a heat exchanger having a substantially sealed volume.

FIG. 5 represents a sectional view of the substantially sealed volume portion 48 of reference cell 27. In the present embodiment the volume is constructed as a rectangular solid having a top 43, a bottom 45, and sides 47. The reference cell in the present embodiment responds to applied heat to provide changes in mass flow or pressure which are communicated at outlet 33. To facilitate the rapid conveyance of heat to the fluid in the volume, the interior comprises a plurality of heat conductive plates 49 and 50 which divide the substantially sealed volume into a plurality of sub volumes 51. Each of the plates 49 has a centrally located opening 55 to permit fluid communication from all the sub volumes 51 to the inlet/outlet conduit 33. The sealed volume 48 is fabricated from plates and spacers made from solder tinned copper sheet. The sealed volume is created by inserting spacers 53 between adjacent plates to form the configuration of FIG. 5. The entire assembly is then heated to melt the solder tinning and allowed to cool to solidly bond all contacting parts. During assembly a temperature sensor such as a miniature type T thermocouple 57 is silver soldered to a face of the reference cell. Alternatively, the temperature sensor may be affixed to an external side 47 of the sealed volume 48.

In one embodiment the spacers 53 are approximately 0.5 mm thick and the plates are approximately 0.12 mm thick. The surface dimension of the plates is approximately 10 mm so that heat applied from two opposing sides 47 is conveyed for approximately 5 mm to the center. The size of the volume can be made larger or smaller than that shown in FIG. 5 by constructing more or fewer layers i.e., sub-volumes 51. Typical enclosed volumes are between 0.2 and 2.0 cc depending on the flow or pressure changes desired and the volume of devices being tested.

Figure 4:
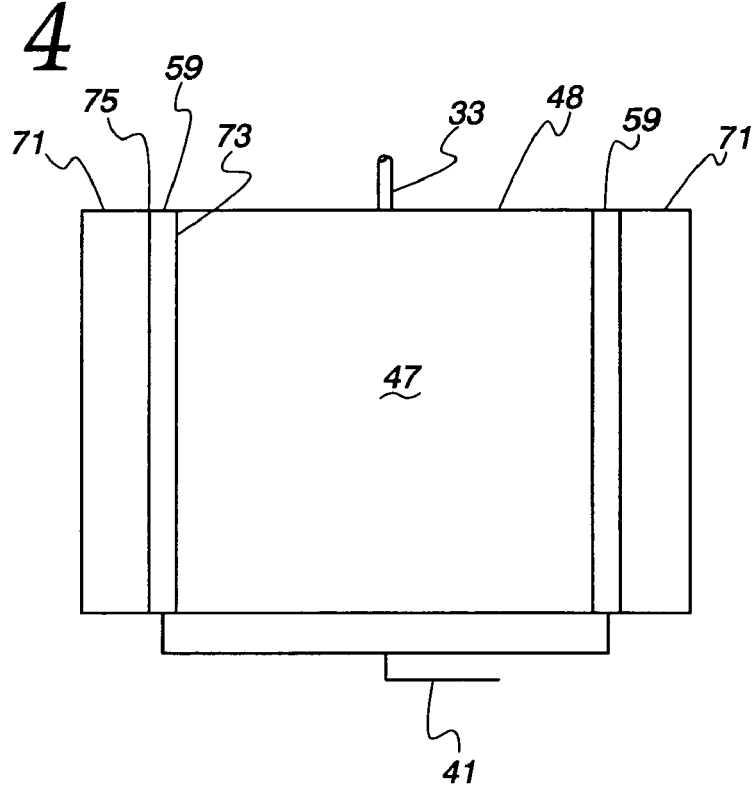
FIG. 4 is a view of a substantially sealed volume having heat/cool devices and heat sinks attached thereto.

After the assembly of the substantially sealed volume 48 of the reference cell 27, it is mated with apparatus for controlling the temperature of the fluid in the volume. FIG. 4 shows an embodiment for rapidly heating and cooling the volume 48. First, two of thermoelectric modules 59 are individually attached to two opposed sides 47 of the sealed volume. A heat sink 71 is then attached to the outer surface of each of the thermoelectric modules 59. Electrical conductors 41 are also connected from the calibrate control 29 to the thermoelectric modules 59. Advantageously, the thermoelectric modules 59 are Peltier devices which move heat from one face 73 to the other 75, depending on the direction and magnitude of current from the controller 29. Thus, selectively controlling the direction and magnitude of current in conductor 41 selectively heats or cools the fluid in the volume. It can be readily seen that other types of thermoelectric modules may be employed.

When constructed and equipped as shown in FIGS. 4 and 5 the sealed volume 48 is a very efficient and rapid heat exchanger capable of both heating and cooling a fluid in the sealed volume. The Peltier modules 59 add or remove heat energy from the cell when current is passed through them, depending on current direction. The cell has a single outlet port 33. The mass flow in the output port is determined by changes in the average cell fluid temperature as follows:

| | | |
|---|---|---|
| Volume of cell | $V_0$ | cc |
| Standard pressure | $P_0$ | psia |
| Standard temperature | $T_0$ | deg K |
| Internal temperature | $T$ | deg K |
| Air mass in cell | $M$ | scc (standard cubic centimeters) |
| Mass flow from cell | $m_c$ | sccm (standard cubic centimeters per minute) |
| Time | $t$ | seconds |

Then from the gas law:

$$M = V_0 * P/P_0 * T_0/T \text{ scc}$$

and $$\text{Mass flow } m_c = -d/dt\{M\} \text{ sccm}$$

Normally, change in P (the test pressure, typically set to 1–5*$P_0$) is negligible c.f.$P_0$ during a leak test calibration cycle. In that case, $$\text{Mass flow} \quad m_c = -V_0 * P/P_0 * d/dt\{T_0/T\} \text{ sccm}$$
$$= -V_0 * P/P_0 * d/dt\{T_0(1 - T + T^2 + \ldots )\} \text{ sccm}$$

It is convenient to keep T within approximately 10 degK of $T_0$(298 degK) because of factors such as Peltier device performance and available heat sink capacity. In that case, terms above $T^2$ can be ignored without affecting accuracy by more than 30 ppm.

Figure 6:
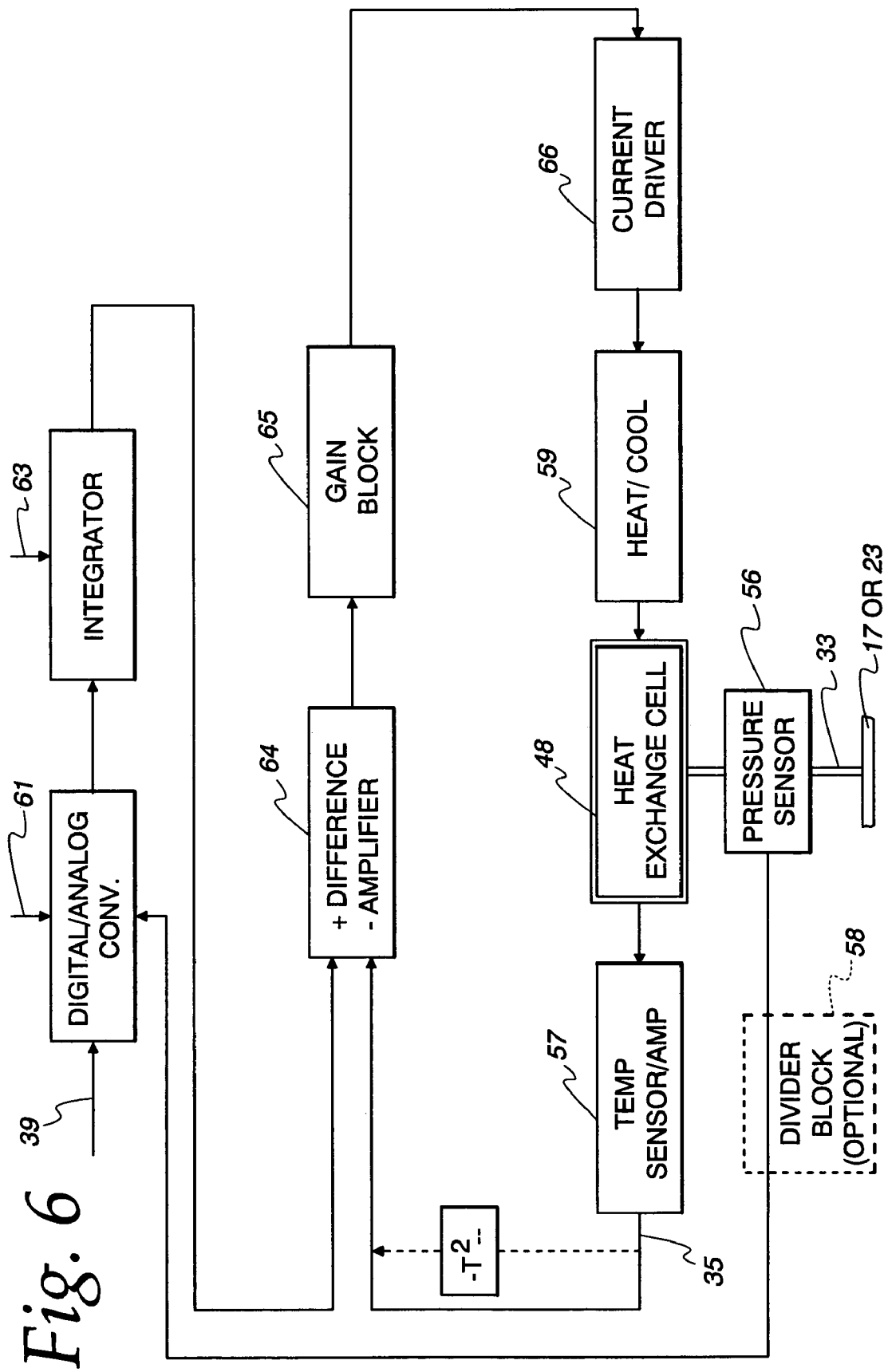
FIG. 6 is a block diagram of a temperature control apparatus.

FIG. 6 is a functional block diagram of the actions performed by calibrate control 29 to achieve a desired pressure and/or mass flow from the cell 48. The primary description of FIG. 6 relates to an analog control structure however, it should be understood that the disclosed functions could be implemented in the digital domain. The calibration process begins when a digital/analog convertor 61 receives a digital signal on conductor 39 which signal identifies a desired flow from or into the volume 48. The desired flow represents the d/dt$\{T_0/T\}$ in the above equation. Digital/analog converter 61 interprets the incoming signal as a calibrate command and converts the digital desired flow representation to an analog voltage level which is applied to an integrator 63. The voltage output of digital/analog converter 61 represents the wanted change of temperature of the sealed volume 48 to achieve the desired result. Integrator 63 responds to the input by generating a time varying output signal which is connected to a + (plus) input of a difference amplifier 64. In the present embodiment the output signal of the integrator varies linearly with time, up (down) to the wanted temperature. It is possible that other systems may be implemented which a different time varying function is employed to provide a non-linear (but repeatable) output signal from integrator 63.

The − (minus) input of difference amplifier 64 receives a signal on conductor 35 representing the inverse of the then present temperature of the volume 48 as generated by temperature sensor 57 and appropriately amplified. A signal representing the $T^2$ term is included to give a sufficiently close approximation to 1/T as described in the last equation above. The output of difference amplifier 64 is applied to the peltier modules 59 via a gain block 65 and a current driver 66 which may be a standard LMD18245 switched current IC. The switched current IC stores energy in a pair of external inductors and can supply larger output current than the average input current. The temperature change of the sealed volume 48 is sensed by the temperature sensor 57 and its associated amplifier and returned to the difference amplifier 64 on conductor 35 as discussed above. The operation described defines a high-gain feed back loop having a gain of, for example, 27 db at 1 hz.

The pressure of the fluid at the sealed volume 48 may also be sensed by a pressure sensor 56 and converted to an inverse electrical signal which is sent to the digital/analog convertor 61. Digital/analog convertor 61 may respond to the pressure signal by modifying inversely the wanted temperature signal sent to integrator 63. The modification of the wanted rate of change of temperature signal is performed to create a wanted temperature needed to achieve a desired mass flow at a sensed pressure. Advantageously, the inverse electric signal may be achieved by an arithmetical division function to produce a true 1/n division. To provide such, the signal line between pressure sensor 56 and digital/analog convertor 61 may include an optional divider block 58.

Receipt of a digital signal on conductor 39 initiates a steady change in cell 48 temperature, either increasing (outflow) or decreasing (inflow), over a period long enough for all of the copper cell, and the fluid within it, to be changing at the uniform rate called for by the digital/analog convertor 61. This period may last for two seconds, for example. Towards the end of this period, one or more sample readings will be taken from the flowmeter 19 in the leak-test system 11 being validated.

After a reasonable time for sampling the flow—say 0.5 sec., the integrator 63 is reset. Entering this state the feedback loop is allowed to saturate, with the maximum rated cooling (or heating) current being applied to the Peltier devices 59. This forces the cell temperature to return as quickly as possible to its rest value, which permits starting the next normal leak-test cycle, with a new test part, as soon as possible. The recovery time is typically between 1 and 9 sec., depending on the direction and magnitude of the previous calibration fluid flow.

When validating a pressure-change leak detecting system, it is convenient to use a similar sequence, i.e., developing an accurate pressure-change within the total system volume, by calling for a fixed calibration flow over a predetermined, fixed test time. The advantage of doing this, rather than simply calling for a change in cell temperature between two accurately known values, is that it simulates the outflow caused by a real leak in the test part.

The shortest overall cycle is achieved when the cell is initially heated (calibration flow outward), then cooled during recovery. The recovery time can in any case be overlapped with the time required to open the leak-test fixture, insert the new part, and close the fixture before starting the next test.

What is claimed is:

1. In a calibration arrangement for use with a test system for detecting leaks in devices, a combination comprising:
   a test apparatus comprising apparatus for testing the fluid properties of a fluid in a testing conduit connected to the device;
   a reference source cell comprising a substantially sealed fixed volume and having an outlet conduit in fluid communication with the testing conduit; and
   a control apparatus for controlling the temperature of the reference source cell volume to produce a controlled fluid inflow or fluid outflow with the testing conduit.

2. The combination of claim 1 wherein the control apparatus comprises circuitry for controlling the temperature of the fluid in the reference source cell.

3. The combination of claim 1 comprising a temperature measurement device for measuring the temperature of the fluid in the reference source cell and wherein the control apparatus comprises apparatus for comparing the measured temperature with a reference value.

4. The combination of claim 3 wherein the reference value varies with time in accordance with a predetermined function.

5. The combination of claim 4 comprising an analog integrator for generating the time varying reference value.

6. The combination of claim 5 comprising circuitry for applying an analog input reference to the analog integrator.

7. The combination of claim 6 comprising a standard reference value identifying a desired fluid property.

8. The combination of claim 7 comprising reference control apparatus for converting the standard reference value into the analog input reference.

9. The combination of claim 8 comprising apparatus for generating a pressure signal responsive to the pressure in the testing conduit and the reference control apparatus responds to the pressure signal for converting the standard reference value into the analog input reference value.

10. The combination of claim 9 wherein the control apparatus responds inversely to the pressure signal.

11. The combination of claim 3 comprising apparatus for generating a pressure signal responsive to the pressure in the testing conduit.

12. The combination of claim 11 wherein the control apparatus responds to the pressure signal for controlling the temperature of the fluid in the reference source cell.

13. The combination of claim 12 wherein the controller responds inversely to the pressure signal for controlling a rate-of-change of the temperature of the fluid in the reference source cell.

14. The combination of claim 3 wherein the control apparatus comprises a comparator for comparing the measured temperature with the reference value.

15. The combination of claim 14 wherein the comparator is an analog comparator.

16. A combination according to claim 3 wherein the temperature measurement device comprises an electrical transducer.

17. A combination according to claim 3 wherein the control apparatus comprises circuitry for continuously comparing the measured temperature to the reference valve.

18. The combination of claim 1 wherein the control apparatus maintains a substantially constant fluid temperature in the reference source cell during leak testing of a device.

19. The combination of claim 1 wherein the reference source cell comprises a plurality of heat conductive plates defining a plurality of sub volumes within the fluid volume of the reference source cell.

20. The combination of claim 19 wherein each of the sub volumes is in fluid communication with at least one other of the sub volumes.

21. A combination according to claim 1 to perform down side leak detection wherein the device is enclosed in a sealed container and the testing conduit provides fluid communication between the sealed container and the test apparatus.

22. A combination according to claim 1 to perform up side leak detection wherein the testing conduit provides fluid communication between the device and the test apparatus.

23. A combination according to claim 1 wherein the reference source cell comprises a thermoelectric transducer for use in controlling the temperature of the reference source cell.

24. A combination according to claim 1 comprising apparatus responsive to the fluid inflow and fluid outflow to adjust portions of the test apparatus.

25. A combination according to claim 1 comprising apparatus responsive to the fluid inflow and fluid outflow to validate the operation of portions of the test apparatus.

* * * * *